United States Patent Office 3,416,041
Patented Dec. 10, 1968

3,416,041
FLAME SENSOR QUENCH CIRCUITS FOR COMBUSTION CONTROL SYSTEMS
Philip Giuffrida, North Andover, and John Pratt, Braintree, Mass., assignors to Electronics Corporation of America, Cambridge, Mass., a corporation of Massachusetts
Continuation-in-part of application Ser. No. 260,126, Feb. 21, 1963. This application Sept. 2, 1965, Ser. No. 484,656
14 Claims. (Cl. 317—148.5)

ABSTRACT OF THE DISCLOSURE

A combustion supervision circuit employs a UV sensitive flame sensor to which is connected a resonant circuit including a capacitor connected in series with the sensor, an inductor connected in series with the sensor, and the secondary winding of a transformer. The inductor has two taps and a filter and integrating network is connected between one tap and one terminal of the inductor. The other terminal of the inductor is connected directly to the flame sensor. An R.F. bypass capacitor is connected between the latter terminal and the other inductor tap. The filter and integrating network operates an SCR switch which controls a flame relay.

---

This is a continuation-in-part of our copending application Serial No. 260,126 filed February 21, 1963, now Patent 3,283,154 and entitled, "Electrical Apparatus."

This invention relates to radiation detection apparatus and, more particularly, to improvements in radiation detection circuitry for deriving pulse signals, which are particularly useful with avalanche breakdown types of devices and for employment with combustion supervision systems.

Flame detection and particularly the supervision of combustion requires a sensor which provides a positive indication of the presence or absence of flame. Among the suitable sensors that are utilized for this purpose is a sensor that has a principal response to a particular range of radiation frequencies, such as a tube of Geiger-Müller configuration in which an avalanche breakdown occurs between two spaced electrodes in response to radiation impinging on one of the electrodes. Such breakdown transforms the sensor from a relatively high impedance device to a relatively low impedance device in a switching operation which is indicative of the sensing of the radiation from the flame, for example.

It is an object of this invention to provide novel and improved circuit arrangements particularly useful in combustion control systems which incorporate radiation sensors of the avalanche breakdown type.

Still another object of the invention is to provide a novel and improved combustion control system incorporating an ultraviolet radiation sensor energizing circuit which upon detection of ultraviolet radiation by the sensor rapidly produces a quenching condition to restore the sensor to its initial high impedance condition.

In accordance with the invention, there is provided a combustion supervision system which utilizes a flame sensor of the avalanche breakdown type which is connected to an energizing source so that an enabling voltage is applied across the sensor. Connected between the source and the flame sensor is a series resonant circuit which has an oscillation frequency that is substantially greater than the frequency of the energizing source. The sensor initially is in a high impedance condition so that no current flows through the series resonant circuit. When the sensor senses radiation, an avalanche breakdown occurs within the tube which transforms it to a low impedance device permitting a relatively large current to flow through that tube and the series resonant circuit. The series resonant circuit controls the current flow through and the potential across the sensor to return the sensor to its high impedance condition independently of the signal from the energizing source. The output pulse from this circuitry is of greater uniformity than when control from the energizing source is relied on for quenching.

This output pulse is preferably sensed by the use of an inductance connected in series with the resonant circuit and having taps coupled directly to an output circuit that is tuned to be responsive to the particular characteristics of the output current pulse generated by this circuitry.

The invention provides improved radiation detection and readout circuitry particularly useful for the reliable supervision of the existence of flame in a combustion control system. Other objects, features, and advantages of the invention will be seen as the following description of particular embodiments thereof progresses, in conjunction with the drawings in which.

Figure 1:
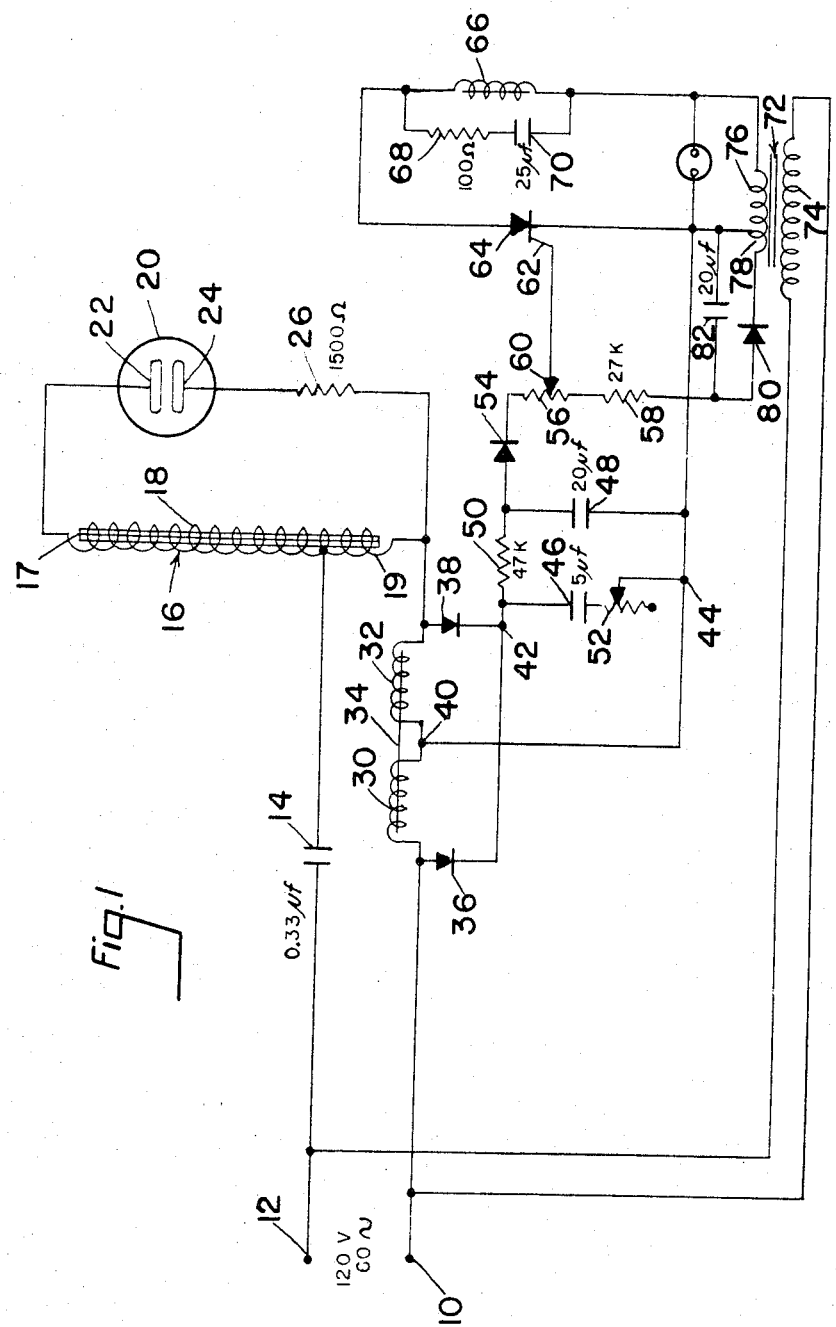
FIGURE 1 is a schematic diagram of a first embodiment of radiation detection circuitry constructed in accordance with the invention.

With reference to FIGURE 1, a 120-volt energizing signal is applied at terminals 10, 12. Connected in circuit with the terminals 10, 12 is a capacitor 14 and an autotransformer 16 having a core 17 on which is wound a single winding 18 having a primary winding portion 19 proportioned in one to six ratio to the entire winding. Connected across the entire winding 18 is a radiation detector 20 having two spaced symmetrical electrodes 22, 24 of material that is photoemissive in response to radiation of the wavelengths of interest. In the case of ultraviolet radiation, tungsten is a preferred material. An ionizable gas, such as hydrogen, is disposed in the detector envelope with the electrodes 22, 24. A current limiting resistor 26 is connected in series with the secondary winding of the transformer and the detector 20.

The effective primary impedance of the transformer winding 19 is matched to the capacitive reactance of capacitor 14 to simulate a tuned circuit at 60 cycle frequency, which circuit has an impedance of about 700 ohms. In the preferred embodiment, the autotransformer resonant circuit arrangement steps up the 120-volt input to an output voltage applied to the detector electrodes of 800 volts (a value above that predictable by the turns ratio relation). Resistor 26 serves to limit the current flowing in the transformer winding when an avalanche breakdown occurs between the tube electrodes. With a high load impedance at the 60 cycle line frequency the transformer core 17 is substantially completely saturated at any input voltage between 90 and 130 volts, and due to this saturated condition the output voltage is maintained constant. A two winding transformer may be utilized as well as the autotransformer winding, but as relatively high currents are carried in the secondary upon avalanche breakdown of a detector which necessitate relatively large current carrying capacity of the transformer secondary winding, some saving in space is afforded by the autotransformer configuration. This circuit maintains a substantially constant voltage across the tube electrodes when that tube is not in avalanche breakdown condition above a minimum necessary to produce photoemissive phenomena and below a value at which the gas will break down in the absence of radiation so that the desired radiation sensitivity is maintained without the production of spontaneous avalanche breakdown conditions.

While the tube is in de-ionized condition a high impedance condition exists which is reflected into the transformer primary circuit, maintaining it in tuned condition so that the energy supplied from the power source is principally used to maintain a high flux density in the core 17, which high flux density serves as a source for current when a low impedance is connected in the secondary circuit. When the gas fill between the tube electrodes 22, 24, ionizes, the tube 20 presents a very low impedance in the secondary circuit and a heavy electric current flows with accompanying collapse of the established flux in transformer core 17. This current is limited substantially only by the resistence of the secondary winding (and the current limiting resistance 26, if any), the coupling between the secondary winding and the magnetic core 17 of the transformer, and the theoretical maximum rate of change of flux ($dq/dt$).

The parameters of the circuit shown in FIGURE 1 are are selected so that the capacitor 14 and the inductance of transformer 16 form a resonant circuit which has an oscillatory frequency substantially greater than that of the line frequency when this resonant circuit is completed through conduction (avalanche breakdown) of the flame sensor tube 20. The current flow that occurs in the resonant circuit due to the avalanche serves to charge capacitor 14 (limited somewhat by inductance of transformer 16). When the capacitor is charged, the current rapidly falls in a half cycle of oscillation to a point below the magnitude (in the order of one milliampere) required to maintain the avalanche breakdown condition in tube 20. When the tube extinguishes, it returns to a high impedance condition preventing further current flow in the series resonant circuit. In this circuit, tube quenching occurs independent of supply voltage passing through zero value and quenching of the tube in this embodiment normally occurs before the supply voltage passes through the zero value. As the high impedance condition of the detector tube is restored upon the termination of the avalanche condition, the resonant condition of the transformer primary circuit to the line source frequency is recreated on the next half-cycle so that the magnetic flux condition and the tubes ultraviolet sensitivity is re-established.

Also connected in series in the primary circuit are two inductors 30, 32. In the preferred embodiment these inductors are wound on a common ferrite core 34 so that each winding has a DC resistance of less than one ohm and an inductance value of approximately 0.75 millihenries. Each coil has a Q of approximately 20 at three kilocycles. When an avalanche discharge takes place, the current pulse is reflected into the primary circuit and a current pulse flows through the coils 30, 32 which has a high rise wave front such that the high Q inductors respond to this signal, producing a substantial voltage drop thereacross. The pulse occurring in the next half cycle, due to the capacitor discharge, also has higher than line frequency components and the high Q inductors also respond to it. Since these current pulses may be of either polarity, the output signals are coupled from the inductors by means of diodes 36, 38 relative to a common center tap 40.

The two diodes are connected to a common terminal 42 of a filter and integrating network and the center tap 40 is connected to termial 44 of the network. That filter includes capacitors 46, 48, a resistor 50 and a sensitivity adjusting resistor 52. This network acts as a decoupling and flame indication signals are stored on capacitor 48. This charge is applied to the discharge network which includes diode 54, a variable resistor 56 and a fixed resistor 58. The tap 60 of the variable resistor 56 is connected to the cathode gate 62 of controlled rectifier 64 (Type 3N58).

The controlled rectifier 64 is connected to control the energization of a condition indicating (flame relay) circuit solenoid coil 66, across which is connected in series resistor 68 and capacitor 70. This circuit is energized for AC operation through a transformer 72 which has a primary winding 74 which is energized from the same 120-volt AC source supplied at terminals 10, 12 and a secondary winding 76 which supplies power to operate the relay 66 as controlled by the rectifier switch 64. A one volt DC bias is applied to the circuitry of the cathode gate 62 through transformer secondary winding 78 and diode 80. Capacitor 82 isolates the signal circuit from the bias circuit.

Capacitor 70 functions to hold in relay 66 during those cycle portions where the switch 64 is not conductive due to the polarity reversal of the voltage supplied by secondary 76 and resistor 68 prevents damage to the switch 64 when the capacitor 70 is completely discharged.

The component values in the filter, discharge and indicating networks in this embodiment are selected so that the relay controlled by coil 66 is not picked up or held in unless detector tube avalanches are occurring at a rate of at least three per second. The initial charge of capacitor 46 is bled off through resistor 50 and imposes a charge on capacitor 48 in a time delay operation. The charge is also subjected to a voltage dividing action by virtue of the resistors 56 and 58. Therefore, unless the current pulses applied to capacitor 46 occur at consistent and reasonably short intervals the charge on capacitor 48 will not apply a potential high enough on control electrode 62 to allow the rectifier switch 64 to fire and energize the relay 66. Diode 54 controls current flow from the control electrode 62 of the rectifier switch 64 after it is turned on. There is a current flow into the control electrode 62 initially to turn the rectifier switch on but after the rectifier switch is turned on a current flow occurs in the opposite direction, and in the absence of the diode or other asymmetrically conductive circuit element this current flow will affect the charge on capacitor 48 and distort the stored charge indicative of the flame conditioin in the supervised area.

Figure 2:
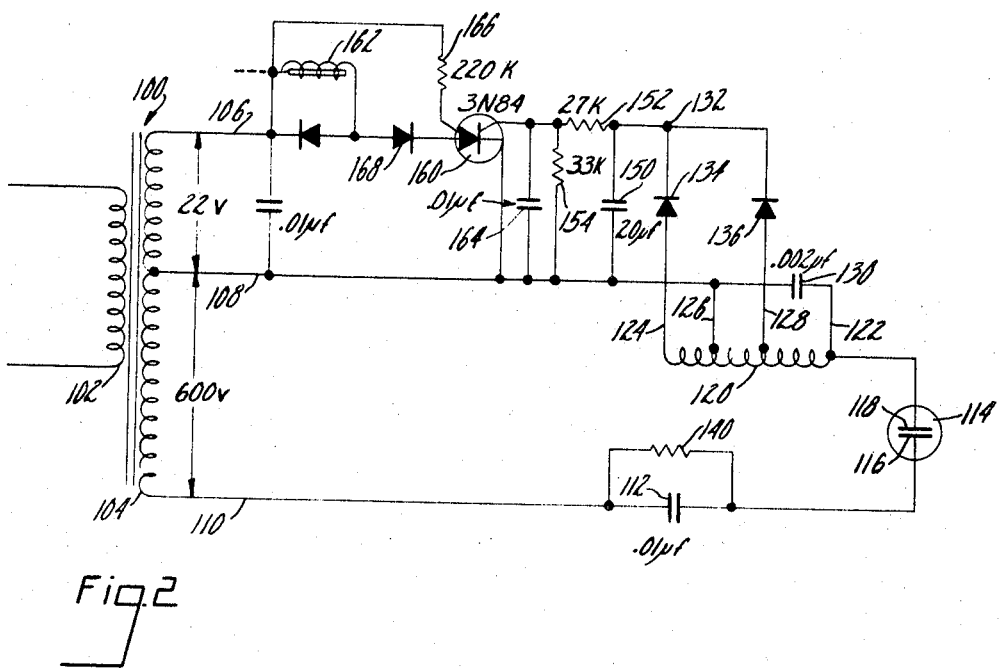
FIGURE 2 is a schematic diagram of a second embodiment of circuitry constructed in accordance with the invention.

A second embodiment is shown in the schematic diagram of FIGURE 2. In that embodiment, there is provided an energizing transformer 100 having a primary winding 102 connected to energizing source and a tapped secondary winding 104 providing twenty-two volts between lines 106 and 108 and six hundred volts between lines 108 and 110. Connected to line 110 is a capacitor 112, a flame sensor 114 having spaced electrodes 116, 118 and an inductor 120 in the nature of an autotransformer having a primary winding between terminal 122 and tap 126 and a center tapped secondary between terminal 124 and tap 128. Capacitor 130 is a radio frequency bypass capacitor to reduce the R.F. side effects produced by the steep wave front UV tube firing pulses. Terminal 124 and tap 128 are connected to junction 132 via diodes 134, 136.

This circuitry, as in the case of the embodiment shown in FIGURE 1 includes a resonant circuit formed by capacitor 112, the inductance 120, and the secondary winding 104. In this circuit capacitor 112 is connected directly in series with sensor tube 114 and the pulse pickoff inductance is also directly in series with the tube. (Primary winding 102 may also have a capacitor connected in series with it to provide the primary 60-cycle resonance condition.) The use of the supplementary series capacitor 112 performs two principal functions. It reduces the width of the current pulse produced when the tube breaks down in avalanche discharge (to a greater extent than is usually possible with the primary capacitance alone as that capacitance value is determined in large measure by the primary resonance criteria) and the capacitor 112 is charged each time tube 114 breaks down so that effectively it may increase the voltage applied across the two electrodes 116, 118. Should this voltage adding condition be undesirable, capacitor 112 can be bridged with a resistance 140 of value low enough to discharge capacitor 112 after the tube has been extinguished so that that capacitor carries no residual charge when the polarity of the supply potential reverses.

The two diodes 134, 136 are connected at junction 132 to a filter and integrating network and the center tap 126 is connected to line 108 as indicated above. The filter network includes capacitor 150 and resistors 152 and 154. The indicated values on the drawing are suitable for a two-second nominal delay. Should a shorter delay be desired, smaller values of capacitor 150 and resistor 152 may be employed. Controlled rectifier 160 is employed to control the energization of flame relay 162. Capacitor 164 is connected between the cathode gate of rectifier 160 and line 108 to provide transient protection and the anode gate has connected to it a resistor 166. Diode 168 provides inverse peak protection for the rectifier 160.

This circuitry operates in substantially the same way as the circuitry previously described in connection with FIGURE 1 to turn on the controlled rectifier 160 when sufficient charge has accumulated in capacitor 150 and energize relay coil 162. That energization provides indication to external circuitry that the sensor 114 is seeing flame in the supervised combustion system.

Figure 3:
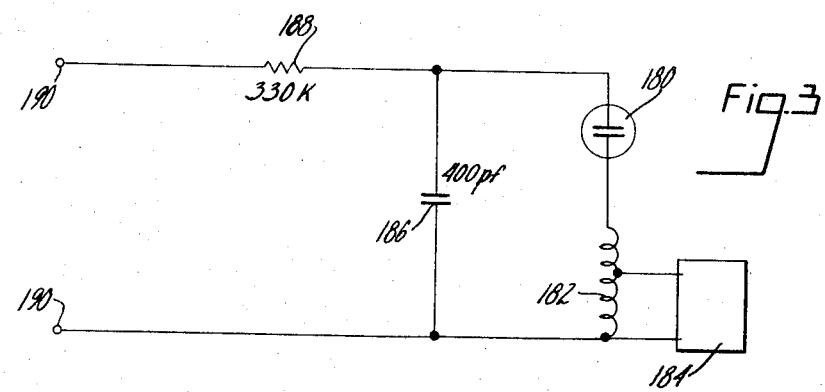
FIGURE 3 is a schematic diagram of still another embodiment of circuitry constructed in accordance with the invention.

A further embodiment of the invention is shown in schematic form in FIGURE 3. That circuit includes a flame sensor 180 of the avalanche discharge type connected in series with an inductance 182 that has load 184 connected to it. The inductance 182 is resonant with a capacitor 186 connected across the tube 180 and the inductance 182. A resistor 188 is connected in series between the capacitor 186 and the energizing source at terminals 190 for controlling the charging rate of capacitor 186. It will be noted that the impedance of capacitor 186 is high as compared with that of resistor 188 so that the shunting effect of the capacitor on the energizing terminals 190 is negligible. When the tube 180 breaks down in avalanche discharge, capacitor 186 discharges through the tube and inductance 182 in an oscillatory manner such that the tube is extinguished after the first current pulse and that current pulse is applied to the load device as an indication of sensing of flame by sensor 180. The current flow charges the capacitor in the opposite polarity and should sensor 180 continue to sense flame it will again break down if it has sufficient electric potential across it. Thus, it will be seen that the invention provides novel combustion supervision circuitry utilizing an avalanche discharge type of detector. The circuit arrangements provide an output signal of uniform characteristics in response to each avalanche breakdown of the flame sensor which is independent of the nature of the energizing source. These output signals are of higher frequency than that of the energizing source and a readout inductor is utilized which is frequency selective so that it responds to these higher frequency flame indications to operate a flame relay or other condition indicator. While particular embodiments of the invention have been shown and described, various modifications thereof will be apparent to those skilled in the art; and, therefore, it is not intended that the invention be limited to the disclosed embodiments or to details thereof and departures may be made therefrom within the spirit and scope of the invention as defined in the claims.

What is claimed is:

1. In a combustion control system, a flame sensor of the avalanche discharge type which switches from a high impedance condition to a low impedance condition in response to the sensing of radiation from a flame, means to connect an energizing source to said flame sensor, a resonant circuit connected in series with said flame sensor, said resonant circuit having an oscillatory frequency substantially greater than the frequency of said energizing source when said flame sensor is in its low impedance condition, and readout means connected in series between said source and said flame sensor responsive to the increase in electrical current flow through said flame sensor in response to the sensing of flame radiation, the oscillatory characteristics of said resonant circuit reducing the current flow through said flame sensor below the sensor's extinction value independently of the signal from said energizing source.

2. The apparatus as claimed in claim 1 wherein said readout means includes an inductive element connected in series between said source and said flame sensor.

3. The apparatus as claimed in claim 1 wherein said resonant circuit includes a capacitor and further including means connecting said capacitor directly to said flame sensor.

4. The apparatus as claimed in claim 3 wherein said readout means includes an inductive element connected in series between said source and said flame sensor, said inductive element being directly connected to said flame sensor.

5. The apparatus as claimed in claim 1 wherein said resonant circuit includes a capacitor connected in series between said energizing source and said flame sensor.

6. The apparatus as claimed in claim 1 wherein said resonant circuit includes a capacitor connected in shunt with said energizing source and with said flame sensor.

7. In a combustion control system, a flame sensor of the avalanche discharge type which switches from a high impedance condition to a low impedance condition in response to the sensing of radiation from a flame, said flame sensor having a pair of symmetrical electrodes so that either may function as anode or cathode, means to connect an alternating signal source to energize said flame sensor so that each electrode alternately functions as anode and cathode, a resonant circuit including a capacitor connected in series with said flame sensor, said resonant circuit having an oscillatory frequency substantially greater than the frequency of the energizing source when said flame sensor is in said low impedance condition, and readout means connected in series between said source and said flame sensor responsive to the increase in electrical current flow through said flame sensor resulting from the sensing of flame radiation, the oscillatory characteristics of said resonant circuit reducing the current flow through said flame sensor below the extinction value of said sensor prior to a change of polarity of the signal applied to said sensor by said signal source.

8. The apparatus as claimed in claim 7 wherein said resonant circuit includes a capacitor and further including means connecting said capacitor directly to said flame sensor.

9. The apparatus as claimed in claim 8 wherein said eadout means includes an inductive element connected in series between said source and said flame sensor.

10. The apparatus as claimed in claim 8 wherein said readout means is an inductor in the nature of an autotransformer, said inductor having two terminals and two taps between said terminals, means connecting the portion of said inductor between one terminal and one tap in series between said source and said sensor and means connecting the other terminal and said two taps to an output circuit.

11. A combustion control system comprising a flame sensor of the avalanche discharge type which switches from a high impedance condition to a low impedance condition in response ot the sensing of radiation from a flame, means to connect an energizing source to said flame sensor, a resonant circuit connected in series with said flame sensor, said resonant circuit having an oscillatory frequency substantially greater than the frequency of the energizing source when said flame sensor is in said low impedance condition, a readout impedance connected in series between said source and said flame sensor for producing an output signal in response to the increase in electrical current flow through said flame sensor produced upon the sensing of flame radiation, the oscillatory characteristics of said resonant circuit reducing the current flow through said flame sensor below the sensor's extinction value prior to the reduction of the signal amplitude from said energizing source to said value, integrating means coupled to said readout impedance, a flame relay, and means responsive to the output of said integrating means for energizing said flame relay.

12. The system as claimed in claim 11 wherein said readout impedance is an inductor in the nature of an autotransformer, said inductor having two terminals and two taps between said terminals, means connecting the portion of said inductor between one terminal and one tap in series between said source and said sensor, and means connecting the other terminal and said two taps to said integrating means.

13. The system as claimed in claim 12 wherein said resonant circuit includes a capacitor and further including means connecting said capacitor directly to said flame sensor.

14. The system as claimed in claim 13 wherein said capacitor is connected in series between said energizing source and said flame sensor.

References Cited

UNITED STATES PATENTS

| | | | |
|---|---|---|---|
| 3,196,273 | 7/1965 | Abromaitis | 250—83.6 |
| 3,263,730 | 8/1966 | Giuffrida | 340—228 X |
| 3,274,580 | 9/1966 | Thomson | 340—228 |
| 3,286,093 | 10/1966 | Gilbert | 340—228 X |
| 3,286,185 | 11/1966 | Gilbert | 340—228 X |
| 3,299,361 | 1/1967 | Pinckaers | 340—228 X |
| 3,336,479 | 8/1967 | Blackett | 340—227 X |
| 3,342,995 | 9/1967 | Axmark | 340—228 X |

JOHN F. COUCH, *Primary Examiner.*

J. A. SILVERMAN, *Assistant Examiner.*

U.S. Cl. X.R.

317—130; 328—6; 340—227